United States Patent Office 3,489,886
Patented Jan. 13, 1970

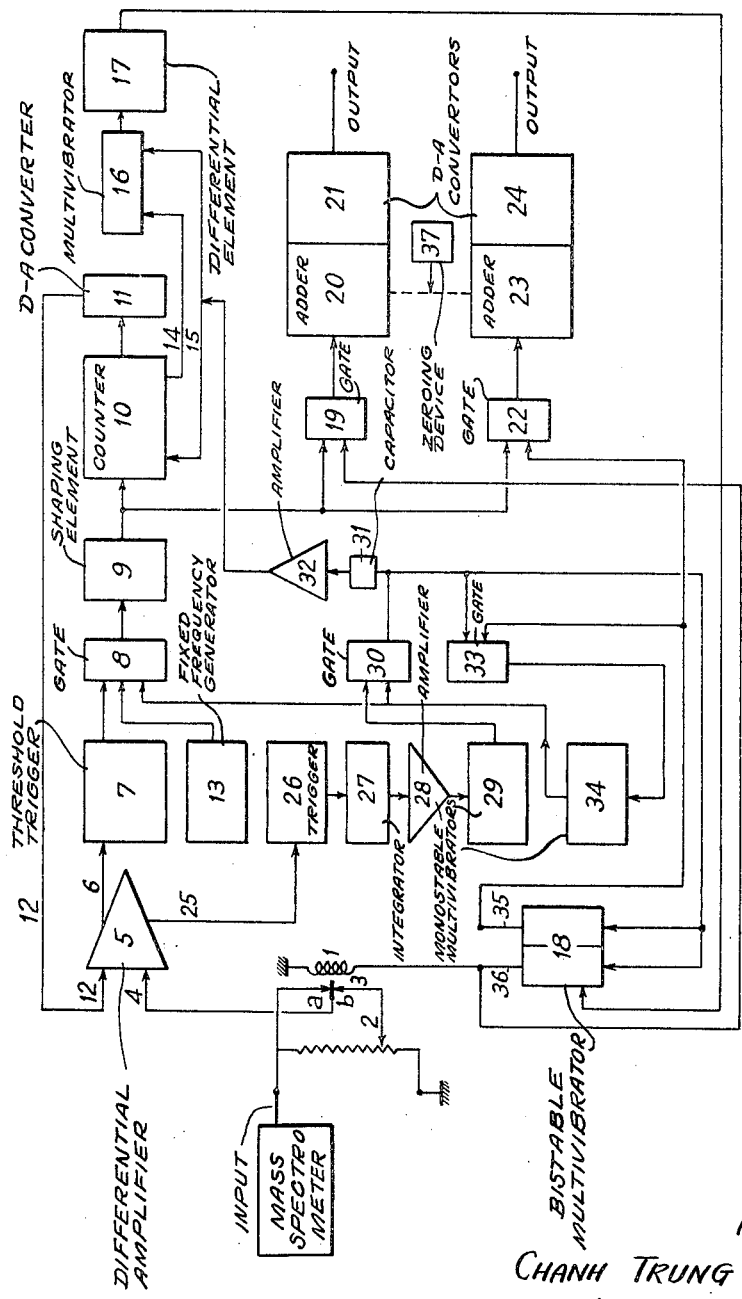

3,489,886
APPARATUS FOR MEASURING THE INTEGRATION VALUE OF A PLURALITY OF SIGNALS UTILISING A SAMPLING SYSTEM
Chanh Trung Huynh and Lucien Espagno, Pau, France, assignors to Societe Nationale des Petroles d'Aquitaine, Paris, France
Filed Mar. 17, 1966, Ser. No. 535,157
Claims priority, application France, Apr. 30, 1965, 15,332
Int. Cl. G06f 15/20; G06g 7/48, 7/18
U.S. Cl. 235—151.35    5 Claims

ABSTRACT OF THE DISCLOSURE

Apparatus for measuring the integrated value of a plurality of signals including means for detecting the point at which the input signal begins to decrease from a maximum value, and means to direct the measured value to an appropriate one of a number of counters equal to the number of input signals.

---

The present invention relates to apparatus for measuring the integrated value of a plurality of signals utilising a sampling system periodically delivering elementary signals whose amplitudes are equal to the instantaneous value of the signals to be integrated. The present application is an improvement of application Ser. No. 526,778.

Apparatus for measuring the integrated value of a plurality of signals are known, whose general principle of operation is as follows:

The instantaneous value of each of the signals to be integrated as delivered by a sampling system is periodically carried out, the different measurements of the instantaneous value of each of these signals being added in an adder corresponding to the signal to be integrated.

The amplitudes of the signals delivered by the sampling system are measured as soon as the signal appears, whose amplitude is desired to be measured by effecting a pulse-counting operation which operation is terminated under the control of the signal when the latter has reached its maximum value.

Such arrangements generally comprise a comparator-amplifier to which is fed, both the signal to be measured through an attenuator and a reference signal. The output of the comparator is connected to a trigger circuit with a threshold valve controlling the closing or opening of a gate, according to whether the signal to be measured is of greater or lower amplitude than the reference signal. The gate permits pulses from a fixed frequency pulse generator, to pass to a counter unit. Moreover, digital to analogue converter, whose input is connected to the counter unit and whose output is connected to the comparator, supplies the reference signal whose value is constantly proportional to the number of pulses contained in the counter unit.

These arrangements also comprise adders in parallel with the counter unit and of number equal to the number of signals to be integrated, and circuits directing the following counting towards the appropriate adders.

For example, one or more of the above features may be found in the following U.S. patents: Patent Nos. 2,994,825; 2,845,597; 2,989,741 and 3,012,195. All of these devices describe analog to digital or digital to analog conversion means in conjunction with a measuring device.

The present invention has for an object a device for measuring the integrated value of a plurality of signals of the above-mentioned type and comprises means suitable for detecting the point at which the signal delivered by the sampling system begins to decrease and for controlling the orientation of the following counting towards the appropriate adder, and means adapted to detect if the capacity of the counter unit is exceeded and for returning the device into a condition for recommencing a new measuring cycle.

According to another feature of the invention, when the signals to be measured are delivered periodically by a mass spectrometer, the device comprises means suitable for stopping the coding operation of the signals and the orienting operation of the following counting during the return of the mass spectrometer scanning cycle.

Other advantages and characteristics of the invention will appear in the following description of one embodiment of the apparatus according thereto, this description being given solely by way of example, and with reference to the accompanying drawing in which the single figure shows such apparatus and intended for integrating a plurality of signals.

The drawing schematically shows a sensitive switching relay associated with a dividing bridge, a differential amplifier, a counter device provided with a digital-analogue converter and with which are associated two adders and the necessary elements of a logic control circuit.

In the drawing, 1 designates a coil connected to the output 36 of a bistable multivibrator 18. Associated with the coil 1, is a relay 3 having two positions $a$ and $b$ connected to a potentiometer 2, and connected to the input 4 of a differential amplifier 5. The output 6 of the differential amplifier 5 is fed to an assembly comprising a trigger circuit 7 with a threshold valve, a control gate 8, a shaping element 9, a binary counter 10 and a digital to analogue converter 11 supplying the input 12 of the differential amplifier 5. A fixed frequency generator at 13 is located in front of the gate 8. A multivibrator 16 connected to a differential element 17, itself connected to the bistable multivibrator 18, is connected to the counter 10, by means of lines 14 and 15.

The output of the shaping element 9 is also connected through the gate 19 to the adder 20 and to its analogue output 21 and through the gate 22 to the adding machine 23 and to its analogue output 24, the two adders comprising a zeroing device 37.

The output 25 of the differential amplifier 5 is fed to an assembly comprising a trigger circuit 26, having a threshold valve, an integrator circuit 27, an inverting amplifier 28, a monostable time-delay multivibrator 29, a gate 30 whose output is connected on the one hand to the counter 10 and to the multivibrator 16 through a capacitor 31, the inverting amplifier 32 and the line 15, and on the other hand to the bistable multivibrator 18 and finally through the gate 33 to the monostable time-delay multivibrator 34 itself connected to the gates 8 and 30.

In addition the gates 22 and 33 are connected to the output 35 of the bistable multivibrator 18 whilst the gate 19 is connected to the output 36 of the same multivibrator.

The operation of the arrangement above described for two signals A and B is as follows:

It is required to measure the integrated value of any two signals A and B which may or may not appear simultaneously.

To this end, a mass spectrometer delivers periodically, at a certain scanning frequency, two unequal elementary signals $a$ and $b$ representing the instantaneous values of signals A and B. The output of the mass spectrometer or other sequential input device is applied to the input terminal of the apparatus. These two elementary signals $a$ and $b$ are firstly equalised by attenuating the larger by means of the potentiometer 2, and they are then alternately fed to the differential amplifier 5 by the relay 3 having two positions $a$ and $b$ controlled by the coil 1 according to the state of the bistable multivibrator 18. The attenuating potentiometer is manually adjusted before the measurement is begun. The operator will generally know the order of magnitude of the signals to be integrated, which permits him to manually set the potentiometer scale in position for proper attenuation. The attenuation factor remains constant throughout the dura- of a measurement.

The elementary signal $a$ whose coding will be effected in the following known manner, is being considered. As soon as the signal $a$ appears, the potential at the input 4 of the differential amplifier 5 begins to increase.

As soon as this potential exceeds $n$ microvolts, the trigger circuit 7 opens the gate 8, this permitting the fixed frequency generator 13 to discharge pulses through the shaping element 9 into the binary counter 10. With the counter 10 there is associated a digital to analog converter 11 which will deliver a certain reference voltage and will apply it to the input 12 of the differential amplifier 5. Thus, the converter 11 will regularly discharge a reference voltage which will continually increase by equal steps of $n$ microvolts and will be applied in negative feedback to the input of the differential amplifier 5; and, as long as the difference in voltage between the inputs 4 and 12 is higher than $n$ microvolts, the gate 8 will remain open and the generator 13 will discharge pulses counted by the counter 10. The increase of the signal is thus followed step by step. The output 6 of the differential amplifier 5 controls the detection of the elementary signal $a$, the counting of the pulses, as long as there is imbalance of the comparator in the direction of development of the elementary signal, and the stopping of this counting operation when the elementary signal no longer increases.

At the same time as the counter 10 records the number of pulses transmitted by the generator 13, the adder 20 records this same number of pulses due to the gate 19 being in the open condition in consequence of the state of the bistable multivibrator 18, whilst the gate 22 controlling the adder 23 is closed by the same bistable multivibrator 18.

The output 25 of the differential amplifier 5 will control, as soon as the amplitude of the elementary signal $a$ diminishes by $n$ microvolts, the return to zero of the counter 10 and the positioning of the relay 3 at $b$.

In fact, when the elementary signal $a$ begins to decrease as soon as a reduction of voltage greater than $n$ microvolts appears between 12 and 4, the trigger 26 delivers a signal integrated by the integrator 27, amplified and inverted by the inverting amplifier 28, and applied simultaneously through the time-delay multivibrator 29 and the gate 30 initially opened by the signal applied by the monostable time-delay multivibrator 34, on the one hand to the counter 10 for returning it to zero and to the multivibrator 16 associated with this counter after differentiation by the capacitor 31, amplification and inversion by the inverting amplifier 32, and on the other hand to the gate 33 kept closed by the state of the bistable multivibrator 18, and finally to the bistable multivibrator 18 whose state is thus modified.

The change of state of the bistable multivibrator 18 will also modify the energisation of the coil 1 and will position the relay 3 at $b$ in relation to the second elementary signal $b$. That is, when the differential intensity at the inputs of the differential amplifier 5 exceeds $n$ microvolts in value (the intensity at input 12 being higher than the intensity at input 4), the trigger 26 will deliver a signal. For the second elementary signal $b$, the operation follows in the same manner except that the counting of the number of pulses transmitted by the generator 13 will be effected by the adder 23, at the same time as that effected by the counter 10, on account of the opening of the gate 22 and the closing of the gate 19 due to the change of state of the bistable multivibrator 18. Moreover, the control signal sent by the trigger 26 will affect, through the gate 33 which is also opened following the change of state of the bistable multivibrator 18, the time-delay multivibrator 34 which thus closes the gates 8 and 30 during the return of the scanning cycle of the mass spectrometer so as to avoid the recording of the two elementary cycle return signals.

Finally, any overflow in the consecutive counter 10 due to defective functioning of the relay 1 or of the potentiometer 2, is recorded by the multivibrator 16 which, through the differentiator element 17, will return the bistable multivibrator 18 to the state corresponding to the first elementary signal of the cycle.

Therefore the logic of the apparatus is controlled by the elementary signals themselves due to the fact that the successive sweepings of the mass spectrometer carries the image of the signals $a$ and $b$ in cyclical order. These signals appear, moreover, periodically. The two adders 20 and 23 are counters of impulses mounted in parallel with the input of the unit counter 10 through the intermediary of the gates 19, 22 placed at the inputs of the respective adders. At the beginning of each intensity peak $a$ the gate 19 associated with the adder 20 is already open, whereas the gate 22 is closed. Similarly, the gate 22 corresponding to the adder 23 is already open at the beginning of each intensity peak $b$ whereas the gate 19 is closed.

Furthermore, during the increase of each intensity peak $a$, for example, the adder 22 registers at the same time as the unit counter 10, the impulses emitted by the oscillator 13 until the moment when the peak reaches its maximum The number of impulses registered by the two counters during an intensity peak corresponds, therefore, to the digital measurement of the maximum amplitude of this peak. But the unit counter 10 is returned to zero between two successive peaks and the number registered in this counter corresponds therefore to the maximum amplitude of the peak $a$, that is to say to the instaneous value constituting A in the mixture.

On the other hand, the adder 20 is not returned to zero between two peaks and the number of impulses registered are added to the digital measurements of the preceding peaks $a$. The number registered in the adder 20 is therefore the sum of the instantaneous values of the constituent A measured periodically. The sum is therefore the integral value of the concentration of the constituent A since the beginning of the measurement.

The impulse counters 20 and 23 register the digital measurement of the integral value in a code, for example, in normal binary code or in binary decimal code or in decimal code, which code can be different from the code chosen for the unit counter 10.

At each counter 20 and 23 may be associated a memory, not shown, for example, a magnetic band or a printer on which is transferred the integral measurement at the end of the operation.

With each counter 20 and 23 is associated a digital to analog converter 21 and 24 which constantly furnishes an intensity proportional to the instantaneous integral value, which can be connected to an apparatus, not shown, for example, on to a dial indicator or on to a graphic register.

At the end of the operation the impulse coming from the apparatus of operation at zero is applied with a delay given in order to reset the adders 20 and 23 to zero.

The number of signals to be treated is obviously not limited to two but may be any number, this also determining the number of adders corresponding to the number of signals to be treated and a series of bistable multivibrators 18 arranged in cascade.

Similarly, if the number of signals is greater than two, the control signal for the change in state of the bistable multivibrator or multivibrators 18 transmitted by the last elementary signal of the cycle closes the counting operations and the logic control circuits during the return of the scanning cycle of the mass spectrometer.

What we claim is:

1. Apparatus for measuring the integral values of a plurality of cyclically and periodically applied variables comprising:
   (a) an input terminal,
   (b) a commutator connected to said input terminal and having a plurality of input terminals and an output,
(c) an attenuator connected to at least one input terminal of said commutator,
(d) a differential amplifier having two inputs and two outputs,
(e) said output of said commutator connected to a first of said differential amplifier inputs,
(f) a first threshold trigger controlling a first gate,
(g) a first of said differential amplifier outputs connected to said threshold trigger,
(h) a constant frequency oscillator,
(i) a counter having an input and two outputs,
(j) said oscillator applying pulses to said counter, said pulses being passed through said first gate,
(k) a first digital to analog converter having an input and an output,
(l) a first output of said counter connected to said input of said digital to analog converter,
(m) said output of said digital to analog converter connected to a second of said differential amplifier inputs,
(n) a plurality of adders,
(o) said adders sequentially connected in parallel with said counter,
(p) a second threshold trigger having an input and an output,
(q) a second of said differential amplifier outputs connected to said second threshold trigger, said second differential amplifier output emitting a pulse when an intensity peak of said applied variable decreases,
(r) means for stepping said commutator successively between said plurality of input terminals,
(s) said second threshold trigger output controlling said means for stepping during the interval between successive peaks of said applied variables, for setting said counter to zero and connecting another of said adders in parallel with said counter.

2. Apparatus as set forth in claim 1 in which said applied variables are generated by a mass spectrometer, and further comprising means for avoiding the registration of spurious intensity peaks during a return cycle of said mass spectrometer.

3. Apparatus as set forth in claim 2 in which said means for avoiding the registration of spurious intensity peaks during a return cycle of said mass spectrometer comprises:
(a) a second monostable multivibrator having an input and an output,
(b) a pair of gates,
(c) one of said pair of gates connected to said input of said second monostable multivibrator,
(d) the other of said pair of gates connected to said output of said second monostable multivibrator,
(e) said gate at said input being controlled, in parallel with a further gate at the input of one of said adders, by a pulse from said first bistable multivibrator,
(f) said gate at said output being connected also to the output of said first monostable multivibrator and operated by said output of said second monostable multivibrator at the same time as said gate at the output of said differential amplifier.

4. Apparatus as set forth in claim 1 in which the number of variables is two and said means for stepping, for setting said counter to zero and connecting another of said adders in parallel with said counter comprises:
(a) an integrator,
(b) said integrator connected to an inverting amplifier,
(c) said amplifier connected to a monostable multivibrator having an output,
(d) said integrator having an input connected to said threshold trigger output,
(e) said output of said monostable multivibrator connected through a gate to a pair of inputs of a bistable multivibrator,
(f) said bistable multivibrator having two outputs, one of which is connected to said commutator and to a second gate, said second gate connecting one of said adders in parallel with said counter, and the other of which is connected to a third gate connecting another of said adders in parallel with said counter,
(g) said output of said monostable is also connected to means for setting said counter to zero.

5. Apparatus as set forth in claim 1 in which said plurality of adders is equal to said plurality of applied variables, and each of said adders has a control gate in series with an input thereof, said control gates being controlled by an output of a multivibrator.

References Cited

UNITED STATES PATENTS

| | | | |
|---|---|---|---|
| 3,103,578 | 9/1963 | Dietrich | 235—150.51 |
| 3,182,181 | 5/1965 | Schumann | 235—150.51 XR |
| 3,185,820 | 5/1965 | Williams et al. | 235—92 |
| 3,192,371 | 6/1965 | Brahm | 235—150.51 XR |
| 3,264,459 | 8/1966 | Ericson | 235—150.51 |
| 3,284,616 | 11/1966 | Ernyei | 235—150.51 XR |
| 3,317,717 | 5/1967 | Schumann | 235—150 |
| 3,322,942 | 5/1967 | Gerard et al. | 235—150.51 XR |

MALCOLM A. MORRISON, Primary Examiner

E. J. WISE, Assistant Examiner

U.S. Cl. X.R.

235—150.5, 150.51, 151.3